JOHN STOCK & JACOB STOCK.
Improvement in Photographic Cameras.
No. 121,553.          Patented Dec. 5, 1871.
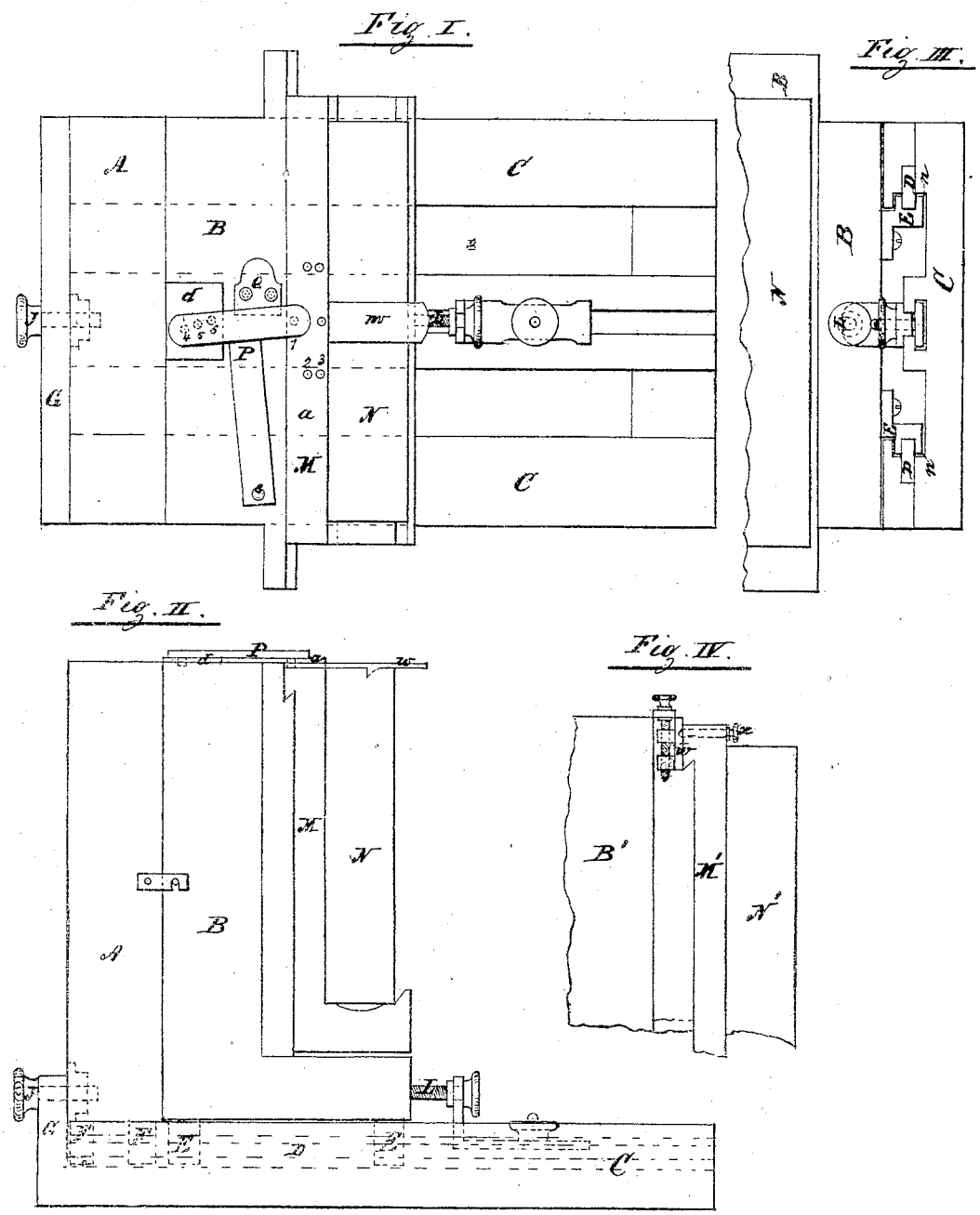

UNITED STATES PATENT OFFICE.

JOHN STOCK AND JACOB STOCK, OF NEW YORK, N. Y.

IMPROVEMENT IN PHOTOGRAPHIC CAMERAS.

Specification forming part of Letters Patent No. 121,553, dated December 5, 1871.

*To all whom it may concern:*

Be it known that we, JOHN STOCK and JACOB STOCK, both of New York city, in the State of New York, have invented certain Improvements in Photographic Cameras, of which the following is a specification:

Our invention consists in the arrangement of the ways upon which the camera slides in such a manner as to protect the same from moisture dripping out of the plate-holder, by placing the same in a suitable groove in the frame; further, our invention relates to the manner of shifting the plate-holder on the camera and of fixing the exact position of the same when it is required to make one, two, three, or more pictures; and further, in the manner of securing the camera firmly to the picture, at the same time facilitating the taking apart of the apparatus for the purpose of packing the same in a small compass for the purpose of transportation.

Figure I represents a top view of a camera embodying our invention. Fig. II is a side elevation of the same. Fig. III is part of an elevation of that end of the camera which is at the right hand in Fig. I, and Fig. IV is a side elevation of parts of a camera referred to in the description.

In the accompanying drawing, A and B represent the camera-box, made in two parts, connected by bellows (not shown in the drawing) in the usual manner, sliding upon the frame C on ways D, situated in recesses $n$ made in the inner sides of the frame. By this arrangement any drippings from the plate-holder or other dirt whereby the easy sliding of the camera on these ways might be hindered is prevented. E E are guides attached to the under side of the box B working on the slides or ways D; and F F (see Fig. II) are similar guides attached to the box A for the same purpose. On the forward end of the frame C a cross-piece, G, is arranged, projecting some distance upward, through which a screw, J, passes, entering a suitable nut attached to the end of the box A for the purpose of fastening the same perfectly tight and firm to the end of the frame C, and which, in combination with the guides F F working on the ways D, will hold this part A of the camera perfectly steady on the frame, while the other part B of the camera is regulated by means of the screw L in the usual manner. This arrangement allows at the same time the apparatus to be taken easily apart for the purpose of packing the same in a small compass for transportation. M is the plate-holder slide, attached and moving on the face of the camera in the usual manner; and N is the plate-holder, fastened to its slide M by means of the spring-catch $m$. This plate-holder slide M requires to be moved certain distances on the face of the camera-box, according as one, two, or more pictures are to be taken on the same plate in the plate-holder N. For this purpose a plate, $a$, is attached upon the top of the plate-holder slide M, having one, two, or more rows of holes, 1, 2, 3, &c., in each row the required number of holes and in the exact position in which the plate-holder has to be placed. To the top of the camera-box B a small plate, $d$, is fastened, with holes 4, 5, 6, &c., corresponding in number with the number of rows of holes in the plate $a$. P is a plate or lever, turning on a center, 8, attached to the top of the camera-box B. This lever is provided with two pins on the under side, one of which fits into one of the holes 4, 5, or 6 in the plate $d$, and the other pin is so arranged as to come then upon the corresponding line of holes in the plate $a$, and enters then one of the holes in that line, fixing thereby the plate-holder in the exact position required. The lever P is operated by a small lever, Q, so as to lift the same out of the holes when the plate-holder requires to be moved, or whenever the said lever P requires to be moved from one hole in the plate $d$ into another hole in the same plate.

Instead of the above-described arrangement for insuring the exact desired position of the plate-holder an arrangement as represented in Fig. IV may be made, where B′ represents part of the camera-box, M′ part of the plate-holder slide, and N′ part of the plate-holder. A plate, $w$, provided with the desired number of rows, having holes in the required position similar to plate $a$, as above described, is attached against the face of the camera, and connected to suitable screws $v$ working in nuts on the back of this plate $w$ in such a manner as to move thereby this plate $w$ upward or downward so as to bring any desired row of holes in said plate $w$ opposite a spring-bolt, $x$, fixed in the plate-holder slide M', whereby the exact desired position of this plate-holder slide M', and consequently of the plate-holder N', can be fixed.

What we claim as our invention, and desire to secure by Letters Patent, is—

1. The arrangement of the ways D in suitable grooves or recesses $n$ made in the sides of the frame C, substantially as and for the purpose hereinbefore set forth.

2. The lever P, lever Q, plates $a$ and $d$ provided with suitable holes or their equivalent, in combination with the camera-box B and plate-holder slide M, substantially as and for the purpose hereinbefore specified.

3. The combination of the cross-piece G, screw J, and slides F F with the box A of a camera, substantially as and for the purpose hereinbefore set forth.

JOHN STOCK.
JACOB STOCK.

Witnesses:
  HENRY E. ROEDER,
  JOHN CHRISTIAN.

(111)